United States Patent

[11] 3,589,400

| [72] | Inventors | Charles D. Bruyn<br>Rte. 94, Box 27, Vails Gate, N.Y. 12584;<br>James H. Bruyn, 111 Coach Lane,<br>Newburgh, N.Y. 12550 |
|------|-----------|---|
| [21] | Appl. No. | 803,328 |
| [22] | Filed | Feb. 28, 1969 |
| [45] | Patented | June 29, 1971 |

[54] AIR VALVE
2 Claims, 6 Drawing Figs.

[52] U.S. Cl. .................................................... 137/625.43
[51] Int. Cl. ..................................................... F16k 11/07
[50] Field of Search ........................................... 137/625.43,
625.68, 625.69, 625.49

[56] References Cited
UNITED STATES PATENTS
2,707,484  5/1955  Rush ........................... 251/62 X

| 1,994,958 | 3/1935 | Moffett | 137/508 |
| 2,531,511 | 11/1950 | Hill | 137/625.43 X |

FOREIGN PATENTS

| 878,501 | 10/1961 | Great Britain | 137/625.43 |

*Primary Examiner*—Alan Cohan
*Assistant Examiner*—Michael O. Sturm
*Attorneys*—Clarence A. O'Brien and Harvey B. Jacobson ABSTRACT: A valve assembly including a cylinder for receiving a valve stem therein. Fluid passages are formed in the valve stem thereby permitting fluid flow in a first direction when the stem is disposed in a first position. When the valve stem is displaced to a second position, the passage formations in the stem cooperate with an enlarged closed end of the cylinder to reverse the fluid flow.

PATENTED JUN29 1971
3,589,400
SHEET 1 OF 2
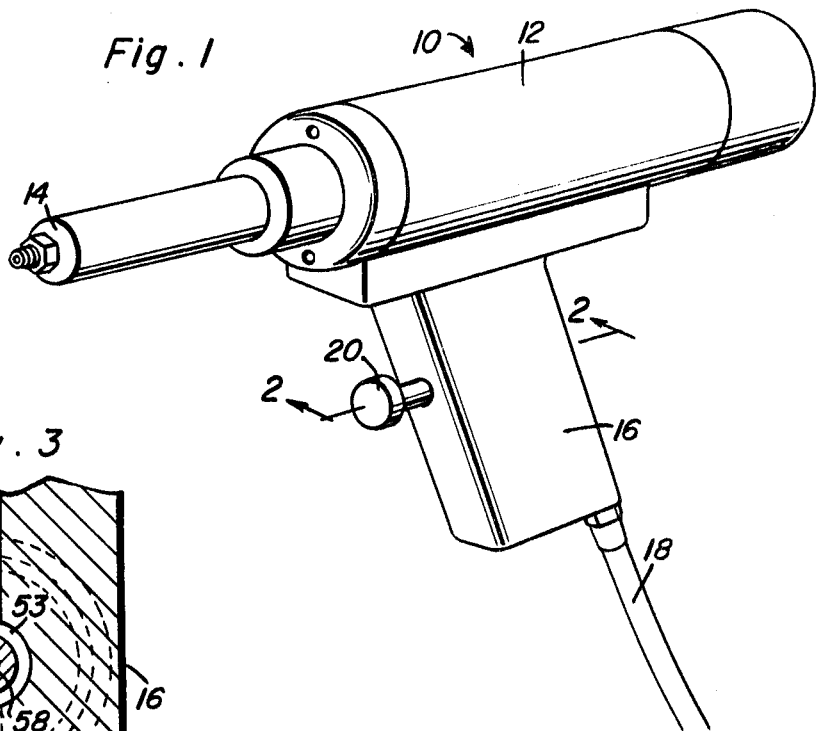
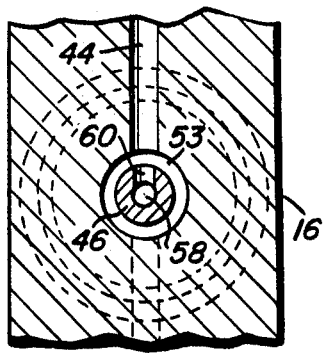
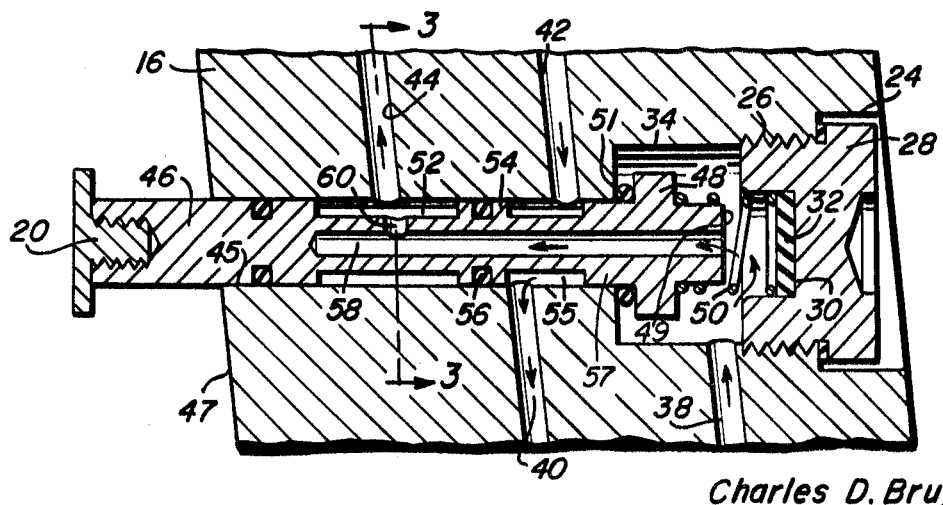
Charles D. Bruyn
James H. Bruyn
INVENTORS
BY *Chauncey A. O'Brien*
*and Harvey B. Jacobson*
Attorneys Charles D. Bruyn
James H. Bruyn
INVENTORS

AIR VALVE

The present invention relates to the field of air valves and more particularly to air valves adapted for use in double-acting rivet guns and like powered tools.

The prior art includes a number of valve assemblies for controlling double-acting tools such as rivet guns and the like. One such example is disclosed in application, Ser. No. 773,886 to Charles D. Bruyn. Although such prior art devices operate satisfactorily, they generally include multiple valve stems operating in parallel or series relation. Inasmuch as the multiple stems are generally connected by means of springs, linkages or the like, extended wear causes a dislocation between the stems with respect to one another. Therefore, such valves tend to be unreliable after extended use. Further, such valve assemblies tend to be more complex and require more frequent maintenance which is both an inconvenience and financial loss to the user.

The present invention includes a valve assembly which is particularly adapted for use with double-acting tools such as rivet guns and the like. However, as will be appreciated, the present invention may be utilized as a control component in other devices.

Basically, the present invention includes a single valve stem received within a cylinder having an enlarged chamber at the inward end thereof which serves as a valve seat. The stem includes recesses formed therein which selectively communicate with input and output intake and exhaust ports. By varying the position of the valve stem, the direction of airflow in the output ports is reversed. By use of a single valve stem having simply formed recesses therein, an economical and highly reliable valve assembly has been produced which effectively controls the operation of powered tools such as a double-acting rivet gun.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIG. 1 illustrates a double-acting rivet gun which can use the present invention for operation control.

FIG. 2 is a partial longitudinal sectional view taken along a plane passing through section line 2-2 of FIG. 1 illustrating the interior components of the valve.

FIG. 3 is a transverse sectional view taken along a plane passing through section line 3-3 shown in FIG. 2.

Figure 4:
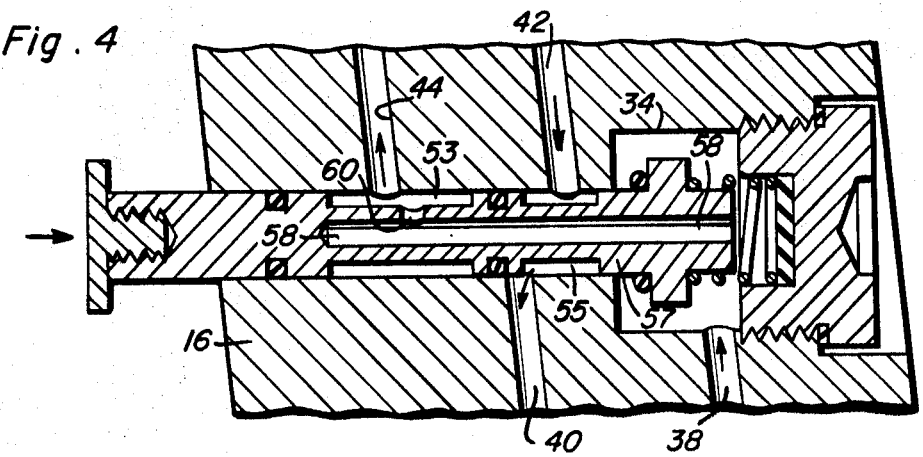
FIGS. 4-6 illustrate the respective relationship of valve parts during displacement of the valve stem.

Referring to the drawings, and more particularly FIG. 1 thereof, where is illustrated a fluid powered tool generally indicated by reference numeral 10 which by way of example may be a double-acting rivet gun. Such tools generally include an elongated barrel 12 for housing piston members which drive work-handling elements such as a chuck which is enclosed within a forward portion of the gun 14. Although the gun per se does not form a part of the present invention, suffice it to say that rivet gun 10 requires a controlled delivery of fluid, preferably air, to the barrel portion 12 thereby permitting a work-handling chuck to grip a rivet (not shown) and then exert pulling forces of great magnitude thereupon.

The present invention is housed within a handle portion 16 of the gun and the position of an interiorly received valve is controlled by means of a cap member or protruding trigger 20.

Referring to FIG. 2 there is illustrated a solid handle portion 16 having an inwardly formed stepped recess 24 extending from the right side of the handle as viewed in FIG. 2. The inwardly stepped portion of the recess includes formed threads 26 for accommodating a threaded end cap 28 having a socket hole therein which enables insertion and removal of the cap. As will be appreciated later, the cap serves as a retainer for the valve assembly of the present invention and permits the insertion and removal of the interior portions thereof. A cylindrical recess 30 is axially formed on the inward end portion of cap 28, the recess serving to accommodate a rubber pad or seal 32 at the closed end thereof. An additional cylindrical recess 34 extends from the previously mentioned recess 24 and forms a chamber when the end cap 28 is in place. The chamber acts as an airflow conduit as hereinafter explained.

An upwardly directed passageway 38 cast in the handle 16 extends from the lower end of the handle to the chamber 34, the intersection between passageway 38 and chamber 34 defining an input intake port. A second cast passageway 40 parallel to the first also extends upwardly from the lower handle end 16 and serves as an input exhaust conduit. As previously mentioned in connection with FIG. 1, a supply line 18 is connected at the lower end of the handle 16 to the passageway 38 while the lower end of the exhaust passageway 40 is exposed to the atmosphere. A third passageway 42 is cast in handle 16 and is positioned in vertically elevated spaced relation to the aforementioned passageways 38 and 40, the passageway 42 further being parallel to the other passageways. The latter mentioned passageway 42 serves as an output exhaust passageway that terminates at the upper end thereof in the barrel portion 12 of the tool. A fourth and last passageway 44 is formed in parallel vertical spaced relation to the aforementioned passageways and more particularly in horizontal alignment with the passageway 42. The upper end of passageway 44 extends to the tool chamber 12 and serves as an output intake passageway to the tool. Passageways 42 and 44 serve as flow reversing ports as hereinafter discussed. An elongated cylinder 45 extends horizontally inwardly of the handle 16 between the forward handle surface 47 and the rearwardly aligned chamber 34.

A cylindrical valve stem 46 is received within the cylinder with the outward end of the valve stem terminating in the cap or finger trigger 20 threadably secured thereto. The inward end portion of the valve stem includes an annular shoulder 48 which serves to restrain the first end of a coil spring 50. The opposite end of the coil spring is received within recess 30 for bearing engagement against the rubber pad 32 received in the recess 30. The opposite surface of shoulder 48 mounts an O-ring 51 which serves as a mechanical stop under the influence of coil spring 50, biasing the valve stem 46 in an outward position. As will be appreciated the steplike surface of shoulder 48, in conjunction with the inner end 49 of the stem 46, forms a reactive surface against which pressure forces generated in pressurized chamber 34 act to force stem 46 outwardly as shown in FIG. 2.

In order to control the direction of fluid flow through passageways 42 and 44, the intermediate section of valve stem 46 includes two annular recesses for gating the flow of air between the input and output passageways. The first such recess 52 encircles that portion of valve stem 46 opposite the output passageway 44. The intersection between the passageway and the recess 52 is defined as the output intake port. When the valve stem is disposed in the normally outwardly disposed position, air is forced to flow through input intake passageway 38 to chamber 34. An axial elongated bore 56 which has an inwardly closed end and an opened inlet confronting rubber pad 32. A radial bore 60 is formed between the bore 58 and recess 52 so that airflow may continue from chamber 34 to the output inlet passageway 44 when the valve stem maintains its normal position.

A second annular recess 55 is formed in the valve stem 46 and permits communication between the input exhaust passageway 40 and the output exhaust passageway 42 when the valve stem is retained in its normal position. The intersection between recess 55 and passageway 42 defines an output exhaust port. The intersection between the recess 55 and passageway 40 defines an input exhaust port. As will be noted from FIG. 2, an annular projection 54 extends radially outwardly to bear against cylinder 45. This projection axially separates recess 52 from recess 54. In order to perfect an airtight seal between the recesses, the projection is annularly slotted to permit the insertion of an O-ring 56 therein.

In order to prevent leakage of air through the forward portion of cylinder 45, an O-ring 60 is received within an annular slot formed in the forward portion of the valve stem.

Figure 5:
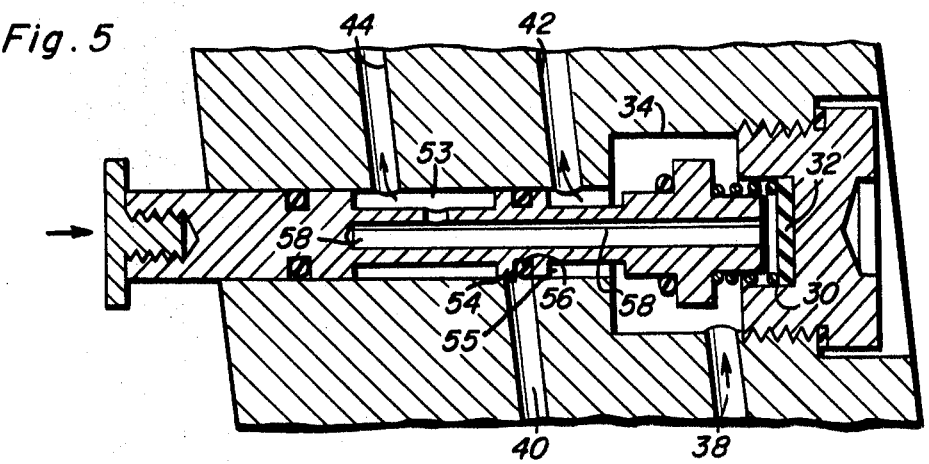
Figure 6:
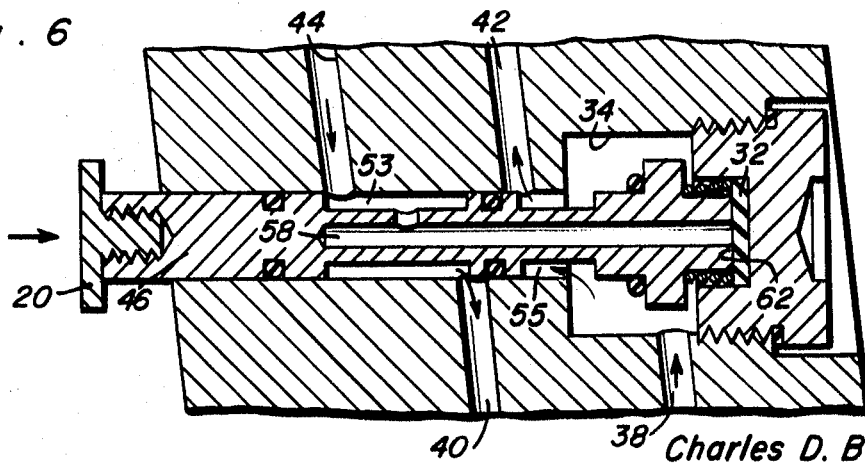

In order to appreciate the operation of the present invention, reference is made to FIGS. 4—6 wherein there is illustrated the three principal positions of the valve stem in relation to the cylinder. FIG. 4 illustrates the valve stem in an outward but slightly depressed position of the valve stem which permits air passage between the output passageways. However, restricted flow through exhaust and output exhaust passageways occurs. Stem portion 57 seals communication between recess 55 and chamber 34 in this position so that stem portion 57 serves as a blocking means.

FIG. 5 illustrates a subsequent position of valve stem displacement wherein the annular projection 54 is disposed in occluding relation with passageway 40 thereby preventing airflow through the input exhaust passageway. As will be noted from viewing the figure, recess 55 has shifted inwardly so that communication between the recess and chamber 34 is effected which results in the flow of air from the input intake passageway 38 to the output exhaust passageway 42. Inasmuch as the annular projection 54 occludes the input exhaust passageway 40, a blast of air coming from the input exhaust passageway is prevented. Further inspection of FIG. 5 will show the entrance of the inward valve stem end into recess 30 thereby causing the somewhat restricted flow of air between input intake passageway 38 and the stem bore 58.

FIG. 6 illustrates the inwardly depressed position of the valve stem 46. In this position, the inward end of the valve stem engages the rubber pad 32 thereby causing the sealing of bore 58 as indicated by 62. When the stem resides in this position, the input intake passageway is free to introduce airflow into chamber 34 and then into output exhaust passageway 42 via recess 55. Also, recess 53 becomes positioned with respect to passageways 40 and 44 so as to permit flow of air from the output intake passageway 44 to the input exhaust passageway 40 via recess 53. Accordingly, as will be appreciated the direction of flow in the output passageways is reversed from the normal flow pattern shown in FIG. 2 when the stem is fully depressed inwardly. Of course, the reverse air pattern change occurs as the valve stem is moved outwardly after removal of a user's finger from trigger 20. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What we claim as new is as follows:

1. In a valve assembly enclosed within a housing, the assembly having a valve stem slidably received in a cylinder formed in the housing, inlet and outlet ports formed in the housing:

a first valve position characterized by blocking means formed on the stem for preventing communication between the inlet port and the outlet port formed in the housing, first means formed in the stem to effect a communication path between the inlet port and a first flow reversing port, and second means formed in the stem to effect a communication path between the outlet port and a second flow reversing port;

an intermediate second stem position characterized by continued action of the blocking means, and sealing means connected to the stem for impeding flow through the outlet port;

an intermediate third position characterized by the sealing means sealing the outlet port while the blocking means becomes inoperative, and means formed in the stem for allowing communication between the inlet and second flow reversing port to produce flow reversal through the latter;

and a fourth position characterized by displacement of the sealing means to effect communication between the first flow reversing port and the outlet port for reversing flow through the first reversing port.

2. The assembly set forth in claim 1 wherein the stem has an inward end portion received in a pressurized chamber formed in the housing, spring means connected to the inward end portion for biasing an inward stem end at a central point in the chamber, and an annular shoulder formed around the inward end portion of the stem which in conjunction with the inward stem end defines unequal opposing reactive surfaces on which chamber pressure forces are exerted to bias the stem into the first position.